(12) United States Patent
Moreels et al.

(10) Patent No.: US 8,930,378 B2
(45) Date of Patent: *Jan. 6, 2015

(54) LABELING SAMPLES IN A SIMILARITY GRAPH

(71) Applicant: Facebook, Inc., Menlo Park, CA (US)

(72) Inventors: Pierre Moreels, San Jose, CA (US); Tudor Andrei Cristian Alexandrescu, Houston, TX (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,492

(22) Filed: Oct. 14, 2013

(65) Prior Publication Data

US 2014/0046959 A1 Feb. 13, 2014

Related U.S. Application Data

(63) Continuation of application No. 13/544,698, filed on Jul. 9, 2012, now Pat. No. 8,583,659.

(51) Int. Cl.
*G06F 17/30* (2006.01)
(52) U.S. Cl.
CPC ...... *G06F 17/3053* (2013.01); *G06F 17/30958* (2013.01)
USPC ........... 707/748; 707/706; 707/708; 707/736; 707/749; 707/750; 707/751; 707/802; 707/803; 707/804; 707/805; 709/201; 709/203; 709/213; 709/217

(58) Field of Classification Search
CPC .................. G06F 17/3053; G06F 17/30958
USPC ......... 707/705–707, 748–751, 736, 802–805; 709/201, 203, 213, 217
See application file for complete search history.

(56) References Cited

U.S. PATENT DOCUMENTS

| 8,583,659 | B1 * | 11/2013 | Alexandrescu et al. | ...... 707/748 |
| 2013/0132194 | A1 * | 5/2013 | Rajaram | ...... 705/14.52 |
| 2013/0151527 | A1 * | 6/2013 | Bruich et al. | ...... 707/737 |

* cited by examiner

*Primary Examiner* — Frantz Coby
(74) *Attorney, Agent, or Firm* — Baker Botts L.L.P.

(57) ABSTRACT

Particular embodiments of a social-networking system maintain one or more data stores storing a social graph comprising user nodes, concept nodes, and edges connecting the nodes. Particular embodiments may determine a confidence score with respect to a user node and a concept node, wherein the confidence score is based at least in part on affinity scores associated with the edges along a sequence of nodes between the user node and the concept node in the social graph. The confidence score may be based on an overall probability that a random walk starting at the user node will end at the concept node. This overall probability may be determined by calculating, for each edge in the random walk, the probability of taking that edge during the random walk, based on the affinity score associated with that edge.

23 Claims, 7 Drawing Sheets

LABELING SAMPLES IN A SIMILARITY GRAPH

PRIORITY

This application is a continuation under 35 U.S.C. §120 of U.S. patent application Ser. No. 13/544,698, filed 9 Jul. 2012, which is incorporated herein by reference.

TECHNICAL FIELD

This disclosure generally relates to social graphs.

BACKGROUND

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g., a social graph), as well as provide social-networking services (e.g., wall-posts, photo-sharing, or instant-messaging) to facilitate social interaction between or among users in the social-networking system.

DESCRIPTION OF EXAMPLE EMBODIMENTS

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system. For example, the user may provide his or her name, profile picture, city of residence, contact information, birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity). For example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as photo sharing, on-line calendars and events, instant messaging, and advertising. For example, the social-networking system may also include media sharing capabilities. Also, the social-networking system may allow users to post photographs and other multimedia files to a user's profile page (typically known as wall posts) or in a photo album, both of which may be accessible to other users of the social-networking system. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 1:
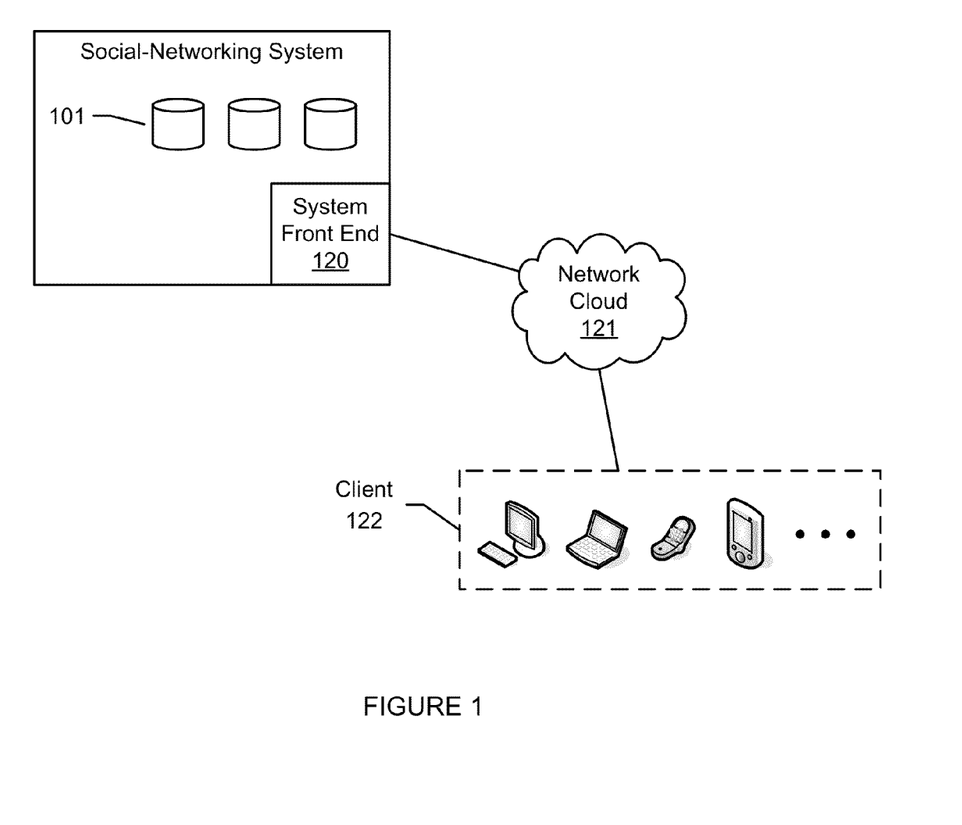
FIG. 1 illustrates an example network environment of a social-networking system.

FIG. 1 illustrates an example network environment of a social-networking system. In particular embodiments, a social-networking system may comprise one or more data stores 101. For example, each data store 101 may comprise one or more storage devices. In particular embodiments, the social-networking system may store in data stores 101 a social graph comprising user nodes, concept nodes, and edges between nodes as described earlier. Each user node may comprise one or more data objects corresponding to information associated with a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 101 may be operably connected to the social-networking system's front end 120. A user of the social-networking system may access the social-networking system using a client device such as client device 122. In particular embodiments, front end 120 may interact with client device 122 through network cloud 121. For example, front end 120 may be implemented in software programs hosted by one or more computing devices of the social-networking system. Front end 120 may include web or HTTP server functionality, as well as other functionality, to allow users to access the social-networking system.

Client device 122 may be a desktop computer, laptop computer, tablet computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

In particular embodiments, the social-networking system may store in data stores 101 data associated with applications and services provided by the social-networking system. In particular embodiments, the social-networking system may store user event data in data stores 101. For example, a user may register a new event by accessing a client application to define an event name, a time and a location, and cause the newly created event to be stored (e.g., as a concept node) in data stores 101. For example, a user may register with an existing event by accessing a client application to confirming attending the event, and cause the confirmation to be stored in data stores 101. For example, the social-networking system may store the confirmation by creating an edge in a social graph between a user node corresponding to the user and a concept node corresponding to the event, and store the edge in data stores 101.

Figure 2:
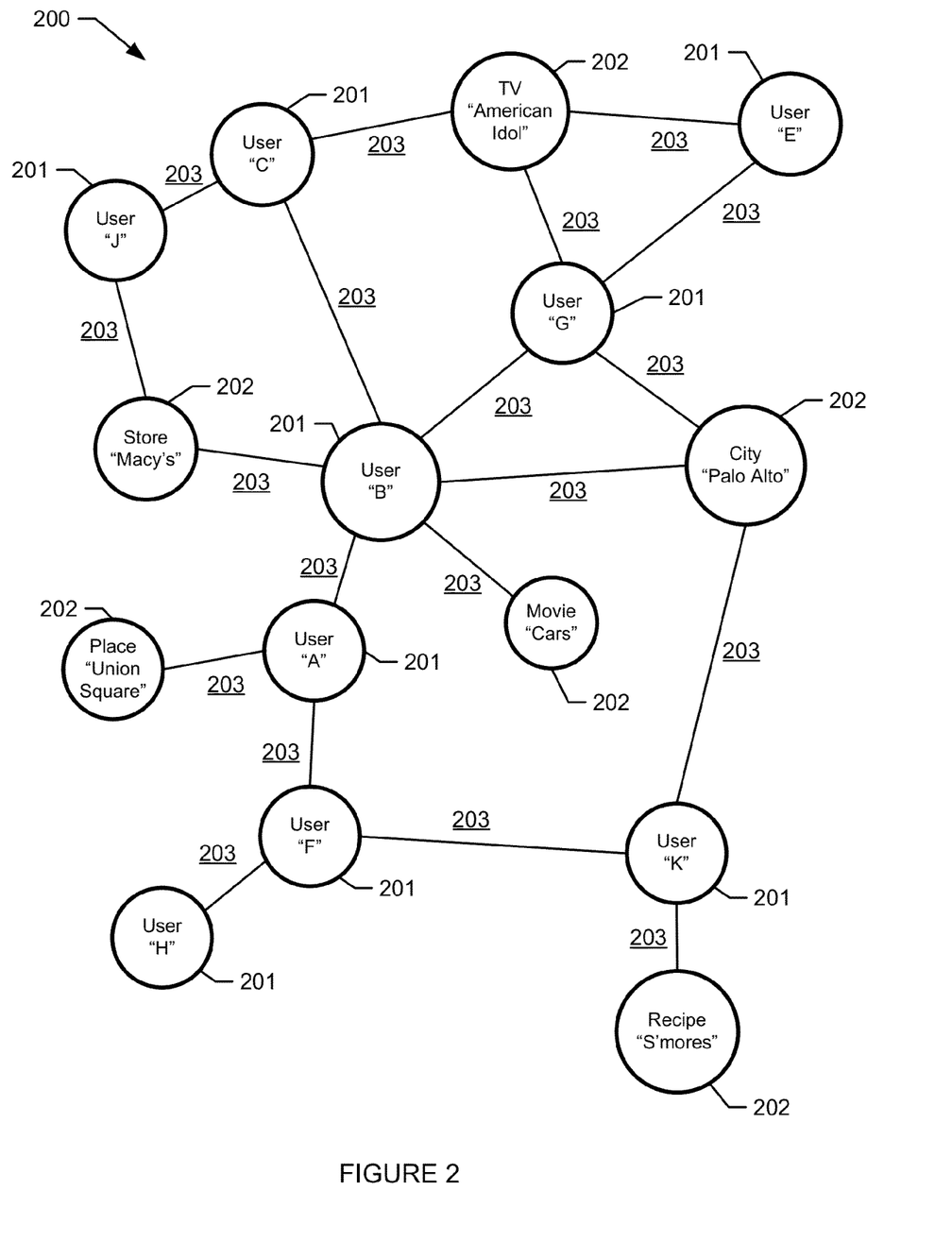
FIG. 2 illustrates an example social graph.

FIG. 2 illustrates an example social graph 200. In the example of FIG. 2, social graph 200 may include user nodes 201, concept nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and G" watch TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes "Macy's." Note that a social graph can be much larger than social graph 200 illustrated in FIG. 2. For example, a social graph used by Facebook of Menlo Park, Calif. can have a number of nodes in the order of $10^9$, and a number of edges in the order of $10^{11}$.

As described earlier, an edge between a pair of nodes may indicate a direct relationship between the pair of nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. It is also desirable to determine likelihood of a relationship or an interest between a pair of nodes that are two or more hops away. For example, the social-working system may provide (e.g., via an email or a wall-post) a recommendation (e.g., an advertisement) for "Macy's" to user "B", given the direct relationship represented by the edge between the user node "B" and the concept node "Macy's" as illustrated in FIG. 2. The social-networking system may also provide a recommendation for "Macy's" to first-degree friends of user "B" (e.g., users "C", "G", "A") as first-degree friends often share comment interests. Meanwhile, it is also desirable to estimate whether users that are further away from user "B" in degrees of separation (e.g., users "E", "F", "H") may also be interested in "Macy's" (and interested in receiving recommendations for "Macy's").

As yet for another example, user "B" may have "Palo Alto" as their city of residence, as illustrated in FIG. 2 by the edges between the concept node "Palo Alto" and the user nodes "B." Although it is common that first-degree friends of user "B" (e.g., "G") live in the same city as user "B", it is desirable to determine the likelihood that those first degree friends and other users who are further away from user "B" in degrees of separation (e.g., users "J", "F", "H") may live in the city of "Palo Alto", since one or more of those users may not have declared a city of residence, or may have moved out of "Palo Alto" but have not updated the change in the social-networking system.

Particular embodiments describe methods of determining likelihood of a relationship between a user node corresponding to a user and a concept node corresponding to a concept. Particular embodiments may determine the likelihood by determining a confidence score between the user node and the concept node.

Figure 3A:
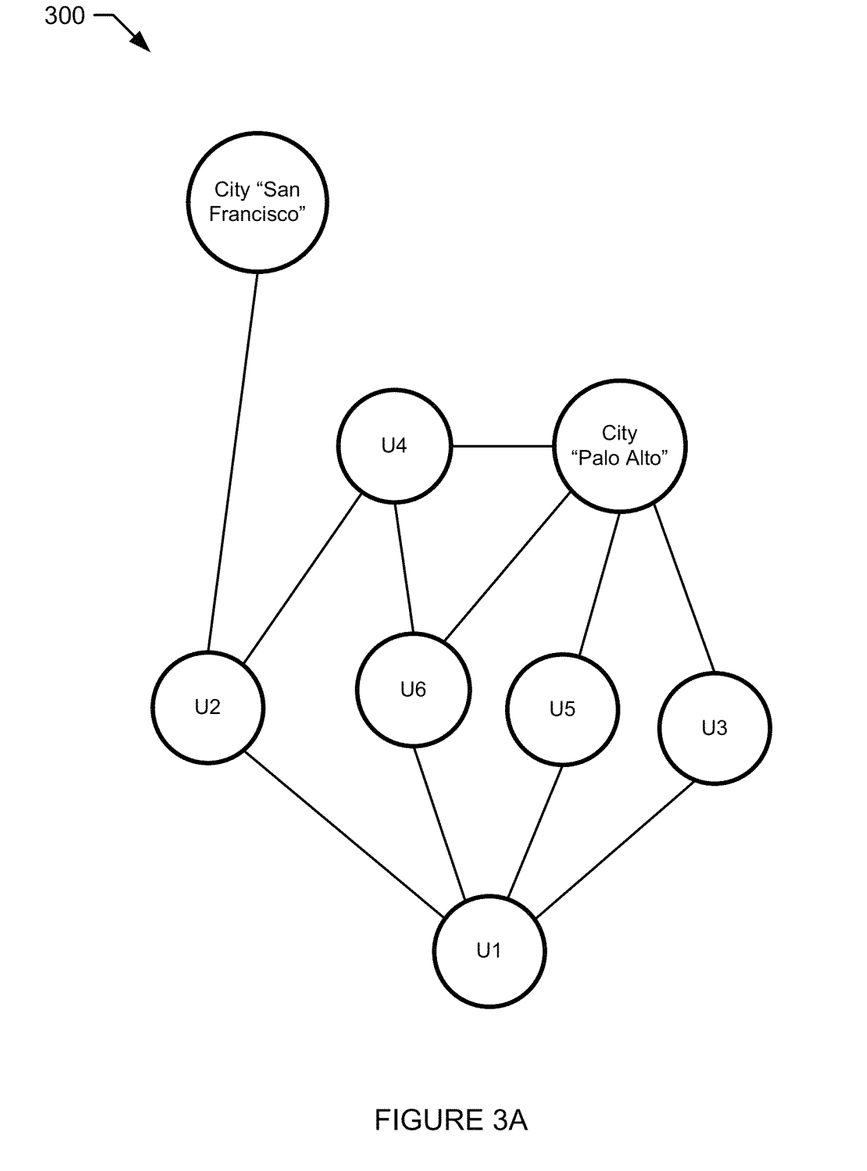
FIGS. 3A and 3B illustrate another example social graph.
Figure 3B:
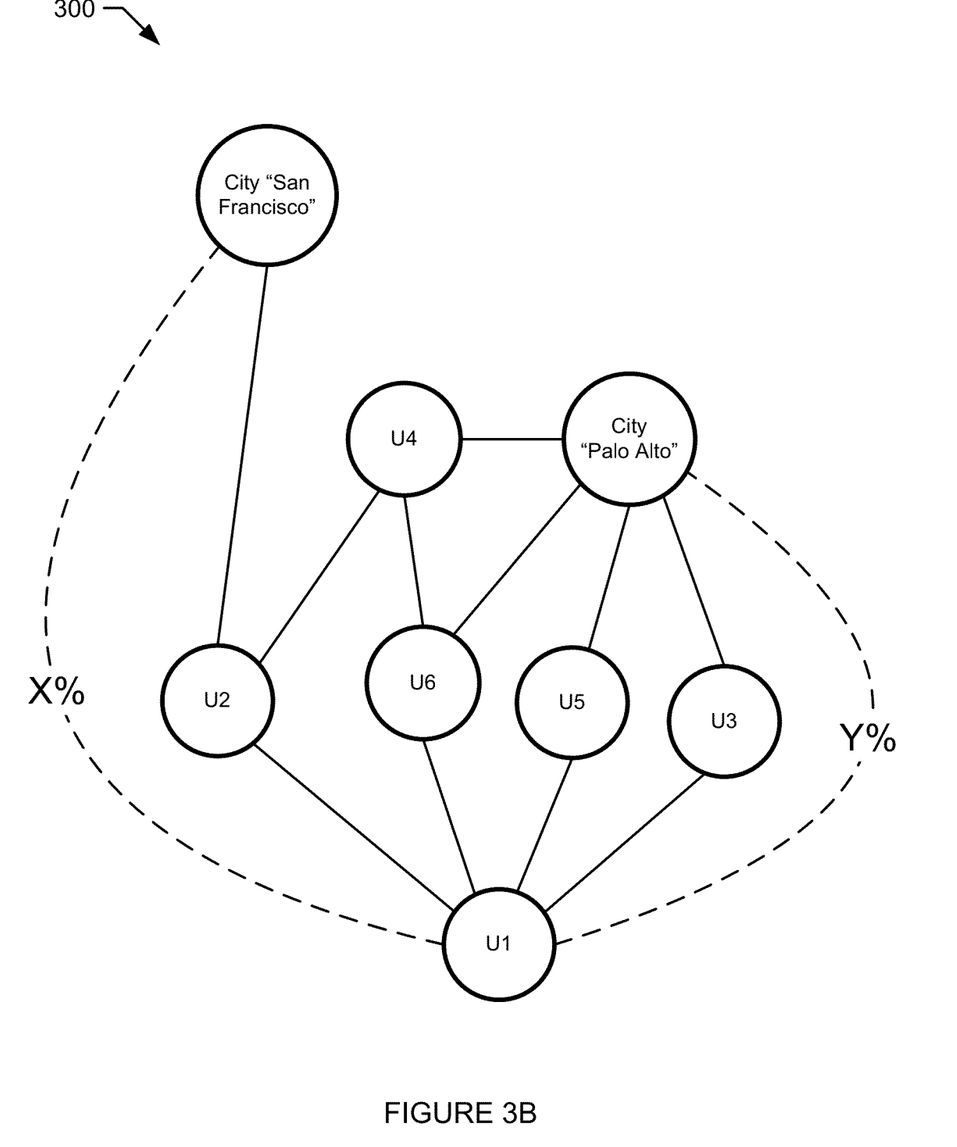

FIG. 3A illustrates another example social graph 300 including user nodes corresponding to respective users, and two concept nodes corresponding to respective cities "San Francisco" and "Palo Alto." Users U2, U3, U5, and U6 are first-degree friends of user U1, while user U4 is a second-degree friend of user U1 and a first-degree friend of users U6 and U2, as illustrated in the corresponding edges. In social graph 300, user U2 has a city of residence in "San Francisco", as indicated by the edge between the user node of U2 and the concept node of "San Francisco." Users U4, U6, U5, and U3 have a city of residence in "Palo Alto", as indicated by the respective edges between the user nodes of those users and the concept node corresponding to "Palo Alto." Meanwhile, in social graph 300, user U1 does not have a declared city of residence. Particular embodiments may determine likelihood that user U1 may live in "Palo Alto" (or in "San Francisco"). Particular embodiments may determine the likelihood by determining a confidence score between the user node of user U1 and the concept node of "Palo Alto" (or between the user node of user U1 and the concept node of "San Francisco"). For example, particular embodiments may determine a confidence score X % between the user node of U1 and the concept node of "San Francisco." That is, user U1 has an X % probability in living in "San Francisco", as illustrated in FIG. 3B. Similarly, particular embodiments may determine a confidence score Y % between the user node of U1 and the concept node of "Palo Alto." That is, user U1 has a Y % probability in living in "Palo Alto", as illustrated in FIG. 3B.

Figure 4:
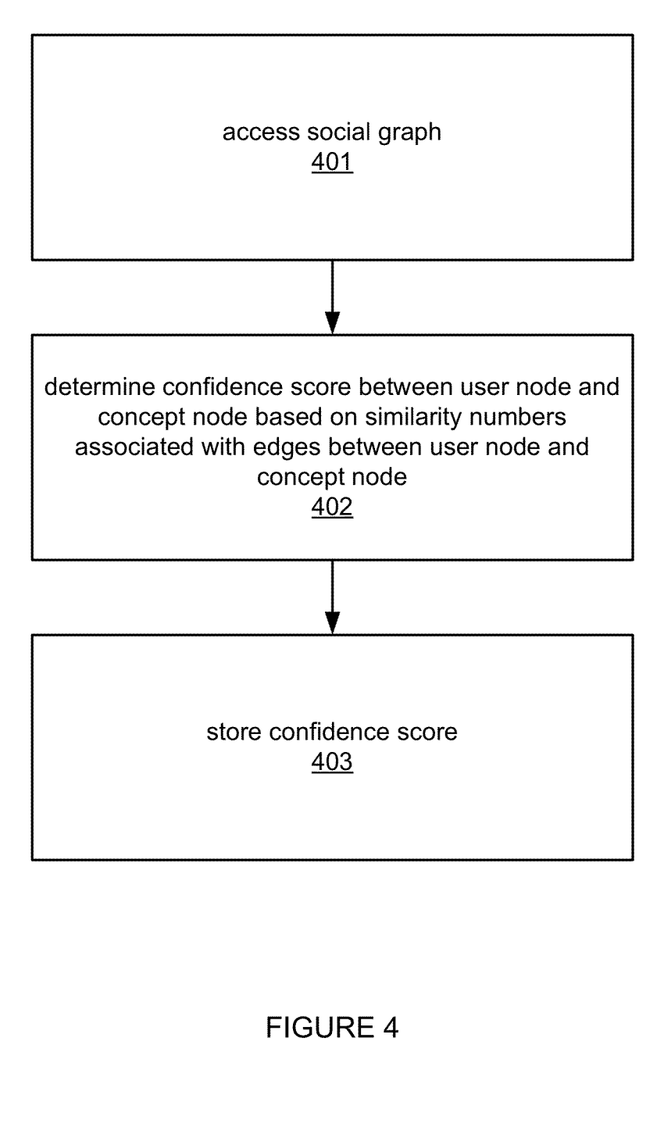
FIG. 4 illustrates an example method for determining a confidence score between a user node and a concept node.

FIG. 4 illustrates an example method for determining a confidence score between a particular user node and a particular concept node. The example method of FIG. 4 may be implemented by an inference process hosted by one or more computing devices of the social-networking system. In particular embodiments, the inference process may access the social graph stored in database 101 for nodes and edges between the particular user node and the particular concept node (STEP 401). In particular embodiments, each of the edges may be associated with a similarity number that indicates an affinity or similarity between the nodes that the edge is in between. For example, the inference process (or another process of the social-networking system) may assign to an edge between two user nodes a similarity number of 1.0 if the two user nodes' corresponding users are married couple, 0.9 if the two user nodes' corresponding users communicate frequently with each other, 0.7 if the two user nodes' corresponding users went to the same college at the same time, or 0.5 as a default value. A system for measuring user affinity is described more generally in U.S. patent application Ser. No. 11/503,093, filed on Aug. 11, 2006 and issued as U.S. Pat. No. 8,402,094 on 19 Mar. 2013, which is hereby incorporated by reference in its entirety and for all purposes.

In particular embodiments, the inference process may determine a confidence score between the particular user node and the particular concept node based at least in part on similarity numbers associated with the edges between the particular user node and the particular concept node (STEP 402). In particular embodiments, the inference process may determine the confidence score by performing on the social graph one or more random walks between the particular user node and the particular concept node. The inference process may also perform in the social graph one or more random walks between the particular user node and other concept nodes of interests. Each random walk may comprise a sequence of user nodes followed by a concept node. That is, each random walk may start from the particular user node and end at a concept node. Using social graph 300 illustrated in FIG. 3A as an example, to determine a confidence score between the user node U1 and the concept node "Palo Alto", the inference process may perform random walks starting from the user node U1 and ending at the concept node "Palo Alto", such as (U1, U2, U4, "Palo Alto"), (U1, U2, U4, U6, "Palo Alto"), (U1, U6, U4, "Palo Alto"), (U1, U6, "Palo Alto"), (U1, U5, "Palo Alto"), and (U1, U3, "Palo Alto"). Similarly, the inference process may perform random walks starting from the user node U1 and ending at the concept node "San Francisco", such as (U1, U2, "San Francisco") and (U1, U6, U4, U2, "San Francisco"). The inference process may determine the confidence score between the particular user node and the particular concept node by determining a probability in that random walks starting from the particular user node will end at the particular concept node (vs. ending at other concept nodes in the social graph). In social graph 300 illustrated in FIG. 3A, for example, a confidence score between the user node U1 and the concept node "Palo Alto" may be 75% (6 out of 8 possible random walks), while a confidence score between the user node U1 and the concept node "San Francisco" may be 25% (2 out of 8 possible random walks).

Furthermore, in particular embodiments, the probability in taking a particular edge in a random walk may be based on the similarity number associated with the edge. That is, the inference process may determine the confidence score between the particular user node and the particular concept nodes based at least in part on similarity numbers associated with edges between the particular user node and the particular concept node. For example, assuming the similarity numbers for edges between U1 and U2, U6, U5, and U3, respectively, are 0.5, 0.5, 1.0, and 1.0, while the similarity numbers for the rest of the edges are 1.0 respectively in social graph 300 illustrated in FIG. 3A. Then the probability of the first hop for a random walk starting from U1 may be 17% to reach U2, 17% to reach U6, 33% to reach U5, and 33% to reach U3. Overall, a confidence score between the user node U1 and the concept node "Palo Alto" may be 89% (vs. 75% if all the edges are weighted the same as described above), while a confidence score between the user node U1 and the concept node "San Francisco" may be 11% (vs. 25% if all the edges are weighted the same as described above).

In general, random walks may be performed by using algebra on a matrix representation of a graph. In particular embodiments, the inference process may perform random walks between the particular user node and the particular concept node, or other concept nodes, by performing matrix computation, as described below. Here, it is assumed that there are n user nodes and C concept nodes of interests in a social graph (for a total of n+C nodes). For example, there are 6 user nodes and 2 concept nodes of interests ("San Francisco" and "Palo Alto") in the example of FIG. 3A. Meanwhile, $W_{pq}$ is a weight encoding a similarity number that indicates an affinity or similarity between node p and node q. In particular embodiments, the inference process may assign a weight between a pair of user nodes based on an affinity between the pair of user nodes, as described earlier. In particular embodiments, a weight between a user node i and a concept node r is $W_{ir}$, for i∈1, ..., n, and r∈n+1, ..., n+C. $W_{ir}$ may be greater than zero if there is a known label (e.g., a known edge or relationship) between the user node i and the concept node r. For example, user U2 is labeled with "San Francisco" in the example of FIG. 3A. $W_{ir}$ may be of infinity (or in practice a very large number compared to all other weights) for "ground truth" confidence in the known label. $W_{ir}$ may be zero if there is no known label between the user node i and the concept node r (e.g., no known edge or relationship between the node pair). Note that a user node may have two or more weights or labels for two or more concept nodes (that do not necessarily have existing edges connecting to the user node). For example, a user may declare "Palo Alto" as his or her city of residence, while the social-networking system (or the inference process) may determine that "San Francisco" is related to the user based on the user's frequent check-in's at locations in San Francisco. A system for predicting a user's location and determining a confidence level of the location prediction based on statistical analysis is more generally described in U.S. patent application Ser. No. 13/235,206, filed on 16 Sep. 2011, which is hereby incorporated by reference in its entirety and for all purposes. In particular embodiments, $W_{rs} \ge 0$, $\forall r$, $s \ge n$. That is, there is no similarity between a pair of concept nodes. In one embodiment, $W_{ij}=1$ if node i and node j fall within k hops from each other (and $W_{ij}=0$ otherwise). That is, only influence from neighboring nodes that are within k hops from a node is considered in the matrix computation.

Figure 5:
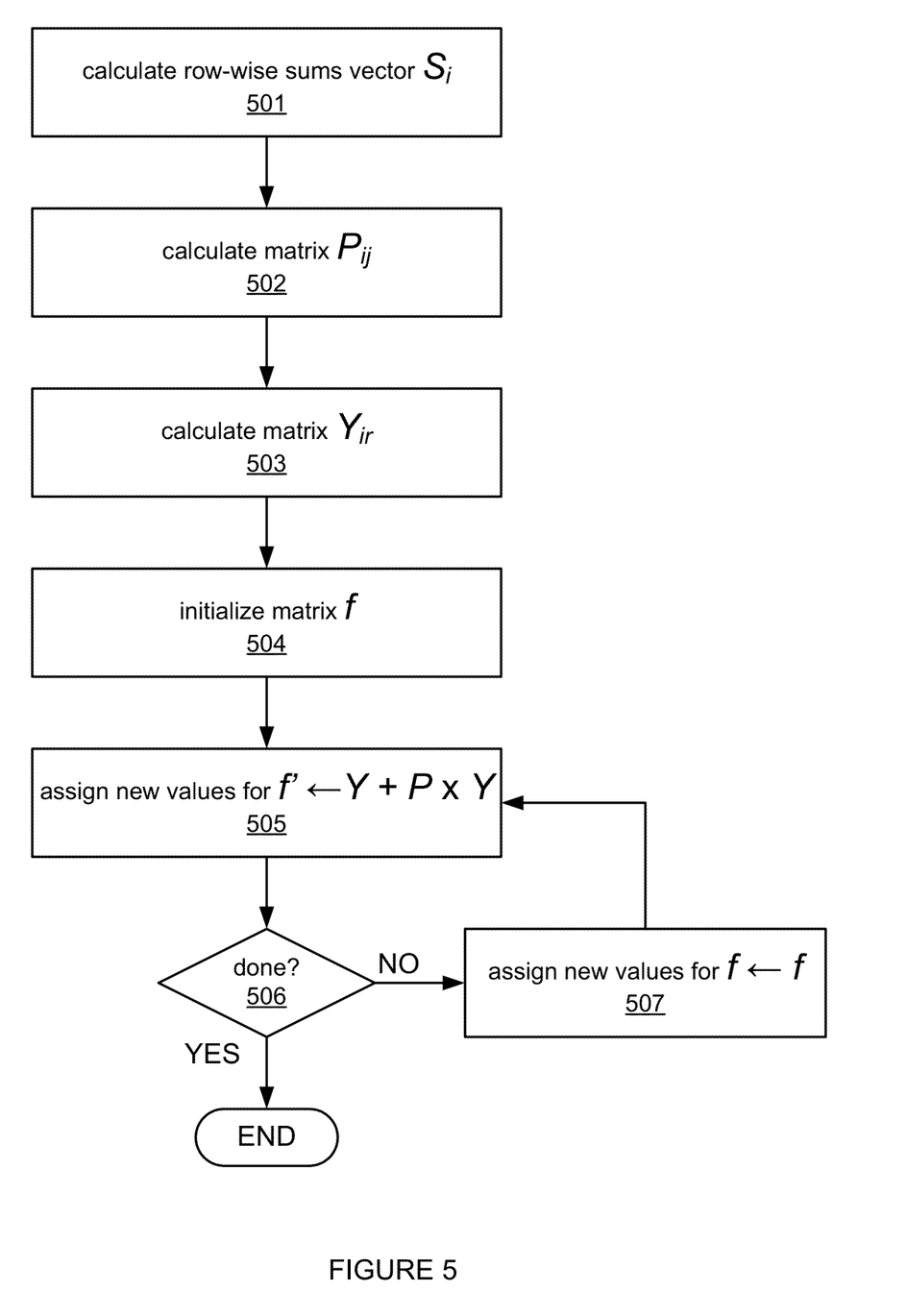
FIG. 5 illustrates an example method for determining a confidence score between a user node and a concept node based on similarity numbers associated with edges between the user node and the concept node using matrix computation.

FIG. 5 illustrates an example method for determining a confidence score between a user node and a concept node based on similarity numbers associated with edges between the user node and the concept node by using matrix computation. The example method of FIG. 5 may be implemented by the inference process (or another process) hosted by one or more computing devices of the social-networking system. In particular embodiments, the inference process may calculate a row-wise sums vector $S_i = \sum_{j=1}^{n+C} W_{ij}$, $\forall i=1, \ldots, n$ (STEP 501). In particular embodiments, the inference process may calculate matrix $$P_{ij} = \frac{W_{ij}}{S_i},$$

$\forall i, 1, \ldots, n$ (STEP 502). $P_{ij}$ may represent a normalized matrix of weights for each pair of user nodes. In particular embodiments, the inference process may calculate matrix $$Y_{ir} = \frac{W_{i,(r+n)}}{S_i},$$

$\forall r=1, \ldots, C$ and $\forall i=1, \ldots, n$ (STEP 503). $Y_{ir}$ may represent a normalized matrix of weights for each pair of a user node and a concept node. In particular embodiments, the inference process may initialize a n×C matrix $f$ with all zeros (STEP 504). In particular embodiments, the inference process may assign new values for the matrix $f$ by: $f' \leftarrow Y + P \times f$ (STEP 505). In particular embodiments, the inference process may determine whether the matrix $f$ has reached a converged solution (within a pre-determined threshold from $f'$) with the matrix computation: $f \cong f'$ (STEP 506). If the matrix $f$ has reached a converged solution, then the inference process may end the matrix computation. If the matrix $f$ has not reached a converged solution within the pre-determined threshold, then the inference process may assign new values for $f: f \leftarrow f'$ (STEP 507), and repeat the matrix computation from STEP 505. In other embodiments, the inference process may end the matrix computation after a specified number of iterations. The number of iterations may be specified based on a prior assumption of relevance of first, second, or k-th degree of connectivity.

The matrix $f$ is a normalized probability distribution solution. That is, $f_{ir}$ is a solution representing a probability or a confidence score that user node i is related to concept node r (e.g., a probability or a confidence score Y % that user U1 lives in "Palo Alto" in the example of FIG. 3A). Furthermore, the example method of FIG. 5 may enable an existing label of a user node (e.g., a connection or relationship between a user node and a concept node as encoded by a positive weight $W_{ir}$) to influence the weighted averaging calculation of the matrix $f$ (e.g., STEP 505).

Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5. Furthermore, although this disclosure describes and illustrates embodiments using matrix algebra techniques, this disclosure contemplates any suitable embodiments using techniques including, but not limited to, relational algebra, randomized algorithm, mutation-based algorithm, or any suitable combination of these techniques. Approximation techniques may also be used to improve processing speed.

In particular embodiments, the inference process may store in data stores 101 the confidence score between the particular user node and the particular concept node (STEP 403). In particular embodiments, the inference process may, based on the confidence score, add and store in data stores 101 one or more edges between the particular user node and the particular concept node. In particular embodiments, the inference process may, based on the confidence score, remove one or more edges between the particular user node and another concept node. Using FIG. 3A as an example, if the confidence score between the user node U1 and the concept node "Palo Alto" is higher than a pre-determined threshold (e.g., higher than 80%), the inference process may create an edge between the user node U1 and the concept node "Palo Alto", since it is very likely the user U1 lives (or works) in "Palo Alto." For example, if the confidence score between the user node U2 and the concept node "San Francisco" is below a pre-determined threshold (e.g., less than 10%), the inference process may remove the edge between the user node U1 and the concept node "San Francisco", since it is unlikely that user U1 is related to "San Francisco." For example, if the confidence score between the user node U4 and the concept node "Palo Alto" is below a pre-determined threshold (e.g., less than 10%) while the confidence score between the user node U4 and the concept node "San Francisco" is higher than a pre-determined threshold (e.g., higher than 80%), the inference process may remove the existing edge between the user node U4 and the concept node "Palo Alto", and create a new edge between the user node U4 and the concept node "San Francisco." That is, the inference process may re-label a user node with a concept node different from an existing connecting concept node based on a confidence score determined by the example methods described in this disclosure. The inference process may add or remove edges connecting to the user node corresponding to the particular user based on the particular user's confirmation. For example, the inference process may add or remove edges connecting to the user node corresponding to the particular user after receiving confirmation from the particular user. To reduce storage requirements for very large graphs, the matrix $f$ may be truncated after each step of FIG. 5 to include only the strongest connected h labels (edges) for each node. This may introduce noise and inaccuracies, but for most graphs and applications the interest is focused only on the top labels, for which predictions may remain properly ranked.

In particular embodiments, the social-networking system may provide to the particular user (corresponding to the particular user node) services (e.g., recommendations) based on one or more confidence scores determined by the example method of FIG. 4. For example, the social-networking system may provide to the particular user (e.g., via emails or wall-posts) an advertisement related to a concept node (e.g., "Macy's" in the example of FIG. 2) that has the confidence score higher than a pre-determined threshold (e.g., higher than 70%). The social-networking system may provide to the particular user services based on the particular user's confirmation. For example, the social-networking system may provide to the particular user services related to a concept node with a high confidence score after receiving confirmation from the particular user.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

The matrix computation of FIG. 5 converges to a final matrix $f$ satisfying $$f^\infty = Y + P \cdot f^\infty,$$

wherein $f^\infty$ represents the matrix $f$ after infinite numbers of iterations (or in practice, after a large enough number of iterations). The matrix computation of FIG. 5 always converges, as $f_{ir} \in [0,1]$ (by the initial normalizations in STEP 502 and STEP 503), while values in $f$ grow monotonically with each iteration (which can be shown by deduction). Thus $f^\infty$ exists per the monotone convergence theorem.

Meanwhile, each value $f_{ir}^\infty$ ($f_{ir}$ after a large enough number of iterations for convergence) may be a weighted average of the corresponding $f_{jr}^\infty$ for all connected neighbors with weights proportional to $W_{ij}$. $f_{ir}^\infty$ is the unique harmonic function which minimize the following cost function (with energy semantics):

$$S = \sum_{i=1}^{n} \sum_{r=n+1}^{n+C} W_{ir}(1 - f_{ri}^\infty)^2 + \sum_{i,j=1}^{n} \sum_{r=1}^{C} W_{ij}(f_{rj}^\infty - f_{ri}^\infty)^2,$$

assuming that $f$ is row-normalized, or $\Sigma_r f_{ir} = 1$ (otherwise the zero-energy solution $f^\infty = 0$ would trivially minimize S). The first sum of the cost function above penalizes labeling (of user nodes) that are not in accordance to the initial labeling, whereas the second penalizes differing labeling between strongly connected user nodes. Overall the harmonic function finds the label probabilities that, within the given constraints, avoid assigning different label probabilities to strongly similar user nodes. This is an intuitively desirable cost function.

The method of FIG. 5 may pose computational challenges for a large social graph. For example, the computation for STEP 505 may involve loading the whole data set (in the order of $n^2$) into the main memory, which may not be feasible with traditional means (even with graph approximation and sparse matrix methods). Particular embodiments may use a distributed relational database method to automatically distribute both data and computation. For example, the computation of STEP 505 may be translated to SQL (Structured Query Language) query commands:

| | |
|---|---|
| CREATE TABLE next_f AS | 1 |
| SELECT COALESCE (Y.id , Pf.id) AS id , | 2 |
| COALESCE (Y.label , Pf. label ) AS label , | 3 |
| COALESCE (Y.sim , 0.0) | 4 |
| + COALESCE (Pf.prob , 0.0) AS prob | 5 |
| FROM Y | 6 |
| FULL OUTER JOIN ( | 7 |
| SELECT P. id1 AS id , f.label , | 8 |
| SUM (P. sim * f. prob ) AS prob | 9 |
| FROM f | 10 |
| JOIN P ON f.id = P. id2 | 11 |
| GROUP BY P.id1 , f. label | 12 |
| ) Pf | 13 |
| ON Y.id = Pf.id AND Y. label = Pf. label | 14 |

The matrices P, Y, and f are formalized relationally as follows. P contains tuples of the form <id1, id2, sim>, where id1 and id2 are unique sample identifiers (e.g., integrals or small strings) and sim is a real number. Y encodes similarities between samples and labels and contains tuples of the form <id, label, sim>. Finally, f and its next iteration next_f have the structure <id, label, prob>. All representations are implicitly sparse; all missing pairs <id1, id2> or <id, label> are assumed to contain zero in the third position.

The parenthesized sub-query across lines 8-12 above effects the multiplication P·f. The statement conceptually enumerates all tuples from f and P connected in the right-hand position of P and then groups together by distinct left-hand items and labels, summing the pair-wise products. For each distinct id1 in P and label r, the join computes the sum $\Sigma_{id2}$ ($P_{id1\ id2}\ f_{id2r}$), which is exactly the element-wise update for the multiplication P·f.

Continuing outwards, the FULL OUTER JOIN statement effects correct sparse matrix addition by selecting all rows from Y and P·f that either match the same sample and label, or are unique to one of the matrices. The COALESCE function selects the first non-NULL of its arguments. The data preprocessing operations (normalization and initialization) are trivially translatable to SQL. A complete SQL-based implementation can be a small 120-lines script, in contrast with the over 3000 lines needed by an industrial-strength C++ implementation (without counting algebra library support).

Particular embodiments may apply to any suitable graph-based applications. For example, in the area of speech recognition, particular embodiments may construct a graph comprising voice nodes, phoneme nodes, and edges between nodes. Each voice node may correspond to a voice segment from a speech, while each phoneme node may correspond to a phoneme in a particular spoken language. Each edge between a pair of nodes may comprise a similarity number indicating similarity between the pair of nodes. For example, similarity between a pair of nodes may be a measure in how similar the respective frequencies of the nodes are. Particular embodiments may determine a confidence score between a voice node and a phoneme node based on similarity numbers associated with edges between the voice node and the phoneme node. Particular embodiments may determine the confidence score using matrix computation illustrated by the example method of FIG. 5.

Figure 6:
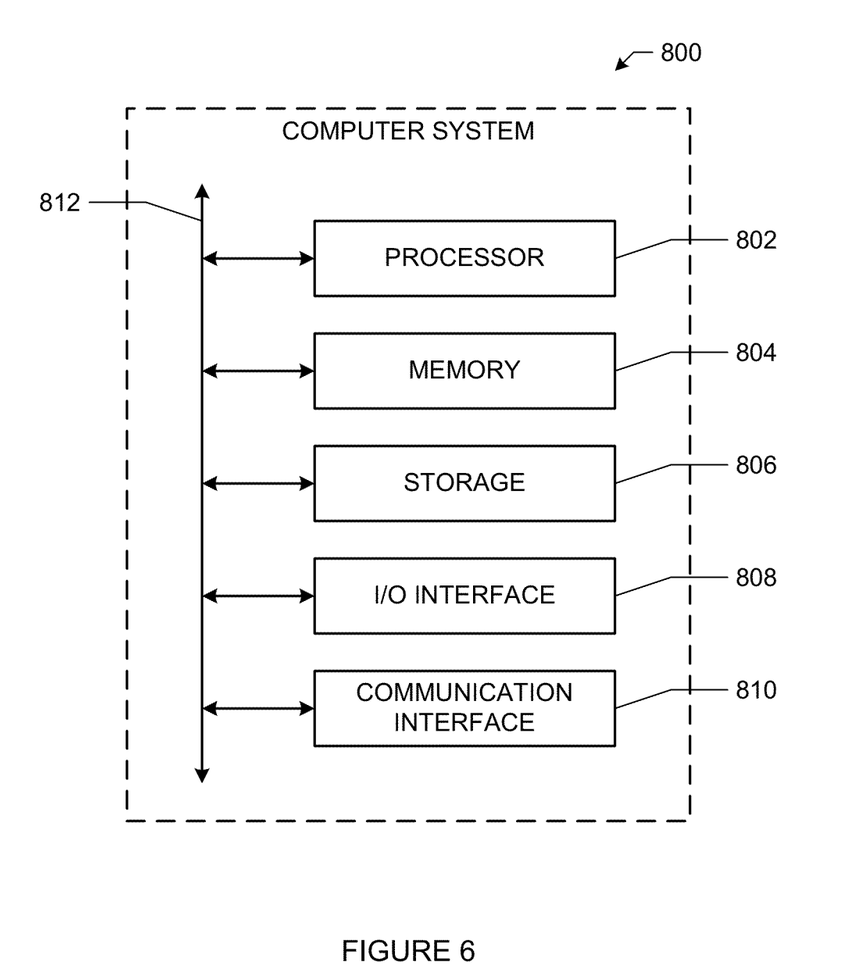
FIG. 6 illustrates an example computer system.

FIG. 6 illustrates an example computer system 800, which may be used with particular embodiments. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, reference to a computer-readable storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, or any other suitable computer-readable storage medium or media), or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   maintaining, by one or more computing devices, one or more data stores storing a social graph comprising a plurality of nodes and a plurality of edges, the nodes comprising user nodes corresponding to users of a social-networking system and concept nodes corresponding to concepts, wherein each edge connects two of the nodes, each of the edges being associated with an affinity score;
   determining, by one or more computing devices, a confidence score between a first one of the user nodes and a first one of the concept nodes based at least in part on one or more affinity scores associated with one or more edges between the first one of the user nodes and the first one of the concept nodes in the social graph; and
   storing, by one or more computing devices, the confidence score in the data stores.

2. The method of claim 1, wherein the determining the confidence score comprises:
   determining a probability that a random walk starting at the first one of the user nodes will end at the first one of the concept nodes.

3. The method of claim 2, wherein the determining the probability that the random walk starting at the first one of the user nodes will end at the first one of the concept nodes comprises:
   determining, for each particular edge in the random walk, the probability of taking the particular edge during the random walk, based on the affinity score associated with the particular edge.

4. The method of claim 1, further comprising:
   providing a recommendation to a user associated with the first one of the user nodes, wherein the recommendation is based on the confidence score, and wherein the recommendation comprises a sponsored story or advertisement related to the first one of the concept nodes.

5. The method of claim 1, further comprising:
   adding or removing one or more edges connecting to the first one of the user nodes after receiving user confirmation.

6. The method of claim 1, further comprising:
   creating a new edge between the first one of the user nodes and the first one of the concept nodes when the confidence score is higher than a pre-determined threshold.

7. The method of claim 1, further comprising:
   removing from the social graph one or more of the edges between the first one of the user nodes and a second one of the concept nodes when the confidence score is below a pre-determined threshold.

8. The method of claim 1, wherein the first one of the concept nodes corresponds to a location associated with one or more users respectively corresponding to one or more of the user nodes, wherein each of the one or more of the user nodes is connected by a respective edge to the first one of the concept nodes.

9. One or more computer-readable non-transitory storage media embodying software that is operable when executed to:
   maintain one or more data stores storing a social graph comprising a plurality of nodes and a plurality of edges, the nodes comprising user nodes corresponding to users of a social-networking system and concept nodes corresponding to concepts, wherein each edge connects two of the nodes, each of the edges being associated with an affinity score;
   determine a confidence score between a first one of the user nodes and a first one of the concept nodes based at least in part on one or more affinity scores associated with one or more edges between the first one of the user nodes and the first one of the concept nodes in the social graph; and
   store the confidence score in the data stores.

10. The media of claim 9, wherein the software operable when executed to determine the confidence score comprises software operable when executed to:
    determine a probability that a random walk starting at the first one of the user nodes will end at the first one of the concept nodes.

11. The media of claim 10, wherein the software operable when executed to determine the probability that the random walk starting at the first one of the user nodes will end at the first one of the concept nodes comprises software operable when executed to:
    determine, for each particular edge in the random walk, the probability of taking the particular edge during the random walk, based on the affinity score associated with the particular edge.

12. The media of claim 9, further comprising software operable when executed to:
    provide a recommendation to a user associated with the first one of the user nodes, wherein the recommendation is based on the confidence score, and wherein the recommendation comprises a sponsored story or advertisement related to the first one of the concept nodes.

13. The media of claim 9, further comprising software operable when executed to:
    add or remove one or more edges connecting to the first one of the user nodes after receiving user confirmation.

14. The media of claim 9, further comprising software operable when executed to:

create a new edge between the first one of the user nodes and the first one of the concept nodes when the confidence score is higher than a pre-determined threshold.

15. The media of claim 9, further comprising software operable when executed to:
remove from the social graph one or more of the edges between the first one of the user nodes and a second one of the concept nodes when the confidence score is below a pre-determined threshold.

16. The media of claim 9, wherein the first one of the concept nodes corresponds to a location associated with one or more users respectively corresponding to one or more of the user nodes, wherein each of the one or more of the user nodes is connected by a respective edge to the first one of the concept nodes.

17. A system comprising:
one or more processors; and
a memory coupled to the processors comprising instructions executable by the processors, the processors being operable when executing the instructions to:
maintain one or more data stores storing asocial graph comprising a plurality of nodes and a plurality of edges, the nodes comprising user nodes corresponding to users of a social-networking system and concept nodes corresponding to concepts, wherein each edge connects two of the nodes, each of the edges being associated with an affinity score;
determine a confidence score between a first one of the user nodes and a first one of the concept nodes based at least in part on one or more affinity scores associated with one or more edges between the first one of the user nodes and the first one of the concept nodes in the social graph; and
store the confidence score in the data stores.

18. The system of claim 17, wherein the processors operable when executing the instructions to determine the confidence score are further operable to:
determine a probability that a random walk starting at the first one of the user nodes will end a he first one of the concept nodes.

19. The system of claim 18, wherein the processors operable when executing the instructions to determine the probability that the random walk starting at the first one of the user nodes will end at the first one of the concept nodes are further operable to:
determine, for each particular edge in the random walk, the probability of taking the particular edge during the random walk, based on the affinity score associated with the particular edge.

20. The system of claim 17, wherein the processors are further operable when executing the instructions to:
provide a recommendation to a user associated with the first one of the user nodes, wherein the recommendation is based on the confidence score, and wherein the recommendation comprises a sponsored story or advertisement related to the first one of the concept nodes.

21. The method of claim 1, wherein:
the first one of the user nodes is associated with a voice segment from a speech of the user,
a subset of the concept nodes are associated with one or more phonemes, the subset comprising the first one of the concept nodes, and
one or more edges connect the first one of the user nodes to one or more of the subset of the concept nodes, each edge being associated with a similarity number; and wherein
the determining the confidence score is based at least in part on one or more similarity scores associated with one or more edges between the first one of the user nodes and the first one of the concept nodes in the social graph.

22. The media of claim 9, wherein:
the first one of the user nodes is associated with a voice segment from a speech of the user,
a subset of the concept nodes are associated with one or more phonemes, the subset comprising the first one of the concept nodes, and
one or more edges connect the first one of the user nodes to one or more of the subset of the concept nodes, each edge being associated with a similarity number; and wherein
the determining the confidence score is based at least in part on one or more similarity scores associated with one or more edges between the first one of the user nodes and the first one of the concept nodes in the social graph.

23. The system of claim 17, wherein:
the first one of the user nodes is associated with a voice segment from a speech of the user,
a subset of the concept nodes are associated with one or more phonemes, the subset comprising the first one of the concept nodes, and
one or more edges connect the first one of the user nodes to one or more of the subset of the concept nodes, each edge being associated with a similarity number; and wherein
the determining the confidence score is based at least in part on one or more similarity scores associated with one or more edges between the first one of the user nodes and the first one of the concept nodes in the social graph.

* * * * *